United States Patent
Oohigashi et al.

(10) Patent No.: US 12,049,561 B2
(45) Date of Patent: Jul. 30, 2024

(54) RESIN COMPOSITION, RESIN FILM COMPRISING SAID RESIN COMPOSITION, AND GLASS LAMINATE INCLUDING SAID RESIN FILM

(71) Applicant: SEKISUI CHEMICAL CO., LTD., Osaka (JP)

(72) Inventors: Yuji Oohigashi, Nara (JP); Yumiko Teraguchi, Takatsuki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 17/783,911

(22) PCT Filed: Dec. 10, 2020

(86) PCT No.: PCT/JP2020/046160
§ 371 (c)(1),
(2) Date: Jun. 9, 2022

(87) PCT Pub. No.: WO2021/117835
PCT Pub. Date: Jun. 17, 2021

(65) Prior Publication Data
US 2023/0002612 A1    Jan. 5, 2023

(30) Foreign Application Priority Data

Dec. 11, 2019 (JP) ................ 2019-223530

(51) Int. Cl.
| | | |
|---|---|---|
| C08L 75/04 | (2006.01) | |
| B32B 17/10 | (2006.01) | |
| C08J 5/18 | (2006.01) | |
| C08L 33/14 | (2006.01) | |

(52) U.S. Cl.
CPC ........ C08L 75/04 (2013.01); B32B 17/10018 (2013.01); B32B 17/10036 (2013.01); B32B 17/10743 (2013.01); B32B 17/1077 (2013.01); C08J 5/18 (2013.01); C08L 33/14 (2013.01); *B32B 2270/00* (2013.01); *B32B 2307/414* (2013.01); *C08J 2333/14* (2013.01); *C08J 2375/04* (2013.01); *C08J 2433/14* (2013.01); *C08J 2475/04* (2013.01)

(58) Field of Classification Search
CPC .. C08L 75/04; C08L 33/14; C08J 5/18; B32B 17/10018; B32B 17/1077; B32B 17/10743; B32B 17/10036
USPC ........................................................ 428/220
See application file for complete search history.

(56) References Cited

U.S. PATENT DOCUMENTS

| | | | |
|---|---|---|---|
| 2015/0274958 A1 | 10/2015 | Henze et al. | |
| 2016/0001530 A1* | 1/2016 | Uto | ............ B32B 27/20 |
| | | | 428/423.1 |
| 2017/0226377 A1 | 8/2017 | Jahns et al. | |
| 2020/0028117 A1 | 1/2020 | Eckert et al. | |

FOREIGN PATENT DOCUMENTS

| | | | | |
|---|---|---|---|---|
| CN | 103031104 | | 4/2013 | |
| CN | 110035896 | | 7/2019 | |
| EP | 3 053 890 | | 8/2016 | |
| EP | 3 202 736 | | 8/2017 | |
| JP | 7-81984 | | 3/1995 | |
| JP | 2015-160866 | | 9/2015 | |
| JP | 2015-532345 | | 11/2015 | |
| JP | 2017030219 A | * | 2/2017 | |
| JP | 2017-66306 | | 4/2017 | |
| JP | 2017-532386 | | 11/2017 | |
| JP | 2018076456 A | * | 5/2018 | |
| WO | WO-0024839 A1 | * | 5/2000 | ......... C08F 283/006 |
| WO | 2014/156726 | | 10/2014 | |
| WO | 2017/200052 | | 11/2017 | |

OTHER PUBLICATIONS

Machine_English_translation_JP_2017030219_A; Kamata; Production method of joint structure; Feb. 9, 2017; EPO; whole document (Year: 2024).*
Machine_English_translation_JP_2018076456_A; Nakano; Adhesive Composition and Adhesive Sheet; May 17, 2018; EPO; whole document (Year: 2024).*
International Search Report (ISR) issued Feb. 22, 2021 in International (PCT) Application No. PCT/JP2020/046160.

* cited by examiner

*Primary Examiner* — Tahseen Khan
(74) *Attorney, Agent, or Firm* — Wenderoth, Lind & Ponack, L.L.P.

(57) ABSTRACT

The resin composition of the present invention has a phase separation structure including a continuous phase of a thermoplastic resin A and a dispersion phase of a thermoplastic resin B, wherein the thermoplastic resin A and the thermoplastic resin B each have a glass transition temperature of −50° C. or more and 50° C. or less, an absolute value of a difference between glass transition temperatures Tg1 and Tg2, which are each in a range of −50° C. or more and 50° C. or less, is 17° C. or less, and a haze at 23° C. is less than 1.5%. The present invention can provide a resin composition excellent in transparency at low temperature, a resin film containing the resin composition, and a glass laminate including the resin film.

15 Claims, No Drawings

RESIN COMPOSITION, RESIN FILM COMPRISING SAID RESIN COMPOSITION, AND GLASS LAMINATE INCLUDING SAID RESIN FILM

TECHNICAL FIELD

The present invention relates to a resin composition, a resin film comprising the resin composition, and a glass laminate comprising the resin film.

BACKGROUND ART

Resin films formed from resin compositions are used in various fields such as packaging materials for foods, base materials for pressure-sensitive adhesive tapes, and various members for wheeled vehicles. For example, resin films formed from acrylic resins or urethane resins are used in interlayer films for laminated glass because of being high in transparency. Such an interlayer film for laminated glass is placed between two glass plates, and used in order to integrate the resultant as laminated glass.

Resin films, while are often formed from single resin components when used in applications where transparency is required, are studied in order to have multiple functions by composite formation of two resins and thus formation of phase separation structures such as sea-island structures.

For example, PTL 1 discloses a resin film comprising an acrylic polymer comprising at least nitrogen-containing monomer as a monomer unit, and a crosslinked urethane polymer, in which a sea-island structure is formed by the acrylic polymer and the urethane polymer. The resin film is indicated to not only be excellent in transparency, heat resistance, weather resistance, strength and flexibility, but also have self-restoring ability for self-restoring due to heating.

For example, PTL 2 discloses a resin particle comprising a (meth)acrylic polymer containing no active hydrogen, and a urethane polymer, in which a phase separation structure is formed from these polymers. The resin particle disclosed in PTL 2 is indicated to be excellent in soft-focus effect without any loss in slipping ability and transparent feeling, due to adjustment so that the refractive index of the resin in each phase satisfies a predetermined relationship, and to be suitably used in external preparations for cosmetics and the like.

CITATION LIST

Patent Literature

PTL 1: JP 2015-160866 A
PTL 2: JP 2017-066306 A

SUMMARY OF INVENTION

Technical Problem

However, such resin films formed by composite formation of two resins, while have multiple functions, are low in transparency, in particular, are remarkably reduced in transparency in a region of temperatures lower than room temperature and have room for improvement.

An object of the present invention is to provide a resin composition comprising a continuous phase and a dispersion phase, the resin composition being excellent in transparency at not only room temperature, but also low temperature, as well as a resin film comprising the resin composition, and a glass laminate comprising the resin film.

Solution to Problem

The present inventors have made intensive studies. As a result, the inventors have found that the above problems can be solved by a resin composition comprising a continuous phase comprising a thermoplastic resin A and a dispersion phase comprising a thermoplastic resin B, the resins A and B each having a glass transition temperature in a specified temperature range, the absolute value of the difference between glass transition temperatures Tg1 and Tg2, which are each in the specified temperature range, being a certain value or less, and the haze at 23° C. being a certain value or less, thereby completing the following present invention.

That is, the present invention provides the following [1] to [15].

[1] A resin composition having a phase separation structure comprising a continuous phase of a thermoplastic resin A and a dispersion phase of a thermoplastic resin B, the thermoplastic resin A and the thermoplastic resin B each having a glass transition temperature of −50° C. or more and 50° C. or less, an absolute value of a difference between glass transition temperatures Tg1 and Tg2, which are each in a range of −50° C. or more and 50° C. or less, being 17° C. or less, and a haze of the resin composition at 23° C. measured according to the following method being less than 1.5%:
(Method for Measuring Haze)
laminated glass is produced by providing a film comprising the resin composition and having a thickness of 800 μm, and two sheets of float glass having a thickness of 1.0 mm, a length of 75 mm and a width of 75 mm, and sandwiching the film between the two sheets of float glass, and a haze at 23° C. of the laminated glass is measured by a method according to JIS K 6714.

[2] The resin composition according to [1], wherein the thermoplastic resin B is an acrylic resin.

[3] The resin composition according to [1] or [2], wherein the thermoplastic resin A is a polyurethane resin.

[4] The resin composition according to any of [1] to [3], wherein the glass transition temperatures of the thermoplastic resin A and the thermoplastic resin B are each −40° C. or more and 20° C. or less.

[5] The resin composition according to any of [1] to [4], wherein the thermoplastic resin B is an acrylic resin, the thermoplastic resin A is a polyurethane resin, and a mass ratio (A/B) of the polyurethane resin to the acrylic resin is 0.4 or more.

[6] The resin composition according to any of [3] to [5], wherein the polyurethane resin has a hard segment mass ratio of 30% or more and 56% or less.

[7] The resin composition according to any of [3] to [6], wherein a long-chain polyol component contained in the polyurethane resin has a molecular weight of 650 or more.

[8] The resin composition according to any of [3] to [7], wherein the polyurethane resin contains a polyether-based polyol.

[9] The resin composition according to any of [2] to [8], wherein the acrylic resin is an acrylic polymer (b) as a polymer of a monomer component, and the monomer component comprises an acrylic monomer (b1) having at least one functional group (X) selected from the group consisting of a hydroxy group, a carboxy group, a thiol group, an amino group, a group having an ether bond, a group having a urethane bond and a group having an amide bond.

[10] The resin composition according to [9], wherein the monomer component comprises an acrylic monomer (b2) containing no functional group (X).

[11] A resin film comprising the resin composition according to any of [1] to [10].

[12] The resin film according to [11], having a thickness of 200 μm or more and 2000 μm or less.

[13] A glass laminate comprising the resin film according to [11] or [12], and a glass member, wherein the resin film is provided on at least one surface of the glass member.

[14] A glass laminate comprising a resin film comprising a resin composition, and a pair of opposite glass members, the resin film being placed between the pair of glass members, the resin composition having a phase separation structure comprising a continuous phase of a thermoplastic resin A and a dispersion phase of a thermoplastic resin B, the thermoplastic resin A and the thermoplastic resin B each having a glass transition temperature of −50° C. or more and 50° C. or less and an absolute value of a difference between glass transition temperatures Tg1 and Tg2, which are each in a range of −50° C. or more and 50° C. or less, being within 17° C., and a haze of the glass laminate at 23° C. measured according to JIS K 6714 being less than 1.5.

[15] The glass laminate according to [14], wherein a ratio (E/F) of a haze (E) at −30° C. to a haze (F) at 0° C. is 2 or less.

Advantageous Effects of Invention

According to the resin composition of the present invention, there can be provided a resin composition excellent in transparencies at room temperature and low temperature, a resin film comprising the resin composition, and a glass laminate comprising the resin film.

DESCRIPTION OF EMBODIMENTS

[Resin Composition]

The resin composition of the present invention has a phase separation structure comprising a continuous phase of a thermoplastic resin A and a dispersion phase of a thermoplastic resin B, wherein the thermoplastic resin A and the thermoplastic resin B each have a glass transition temperature of −50° C. or more and 50° C. or less, the absolute value of the difference between glass transition temperatures Tg1 and Tg2, which are each in a range of −50° C. or more and 50° C. or less, is within 17° C., and the haze at 23° C. measured according to the following method is less than 1.5.

The resin composition is excellent in transparencies at room temperature and low temperature. The transparency at low temperature means a transparency in a region of temperatures less than room temperature (23° C.), and specifically means a transparency at 0° C. or less (for example, −30° C.).

(Glass Transition Temperatures of Thermoplastic Resins A and B)

The thermoplastic resin A and the thermoplastic resin B each have a glass transition temperature of −50° C. or more and 50° C. or less. In a case where at least one of the thermoplastic resins A and B does not have a glass transition temperature of −50° C. or more and 50° C. or less, the resin composition is reduced in transparency at room temperature or low temperature, or transparencies at both such temperatures.

The thermoplastic resin A and the thermoplastic resin B each preferably have a glass transition temperature of 30° C. or less, more preferably 20° C. or less, and each preferably have a glass transition temperature of −40° C. or more, from the viewpoint that the resin composition has an enhanced transparency at low temperature.

Both the glass transition temperatures of the thermoplastic resin A and the thermoplastic resin B can be adjusted in desired ranges by appropriately selecting the types and the like of respective monomers forming the resins.

The glass transition temperatures of the thermoplastic resin A and the thermoplastic resin B are glass transition temperatures obtained by each independently measuring the thermoplastic resin A and the thermoplastic resin B.

More specifically, the glass transition temperature of the thermoplastic resin A corresponds to a peak temperature at tanδ, obtained by producing a film-shaped sample comprising the thermoplastic resin A and subjecting the sample to dynamic viscoelasticity measurement. The glass transition temperature of the thermoplastic resin B is also obtained in the same manner, and corresponds to a peak temperature at tan δ, obtained by producing a film-shaped sample comprising the thermoplastic resin B and subjecting the sample to dynamic viscoelasticity measurement. Dynamic viscoelasticity measurement conditions are as described in Examples.

While a plurality of such peak temperatures at tan δ may be sometimes observed, in such a case, at least one of such peak temperatures at tan δ may be in a range of −50° C. or more and 50° C. or less.

Herein, the glass transition temperatures of the thermoplastic resin A and the thermoplastic resin B, each independently measured, may respectively differ from the glass transition temperatures of the thermoplastic resin A and the thermoplastic resin B, determined by subjecting the resin composition of the present invention to measurement. The reason for this is because, when the affinity between the thermoplastic resin A and the thermoplastic resin B is good, the glass transition temperatures of the resins are closer to each other in the case of the resin composition.

(Glass Transition Temperatures Tg1 and Tg2)

In the resin composition of the present invention, the absolute value of the difference between a glass transition temperature Tg1 and a glass transition temperature Tg2, which are each in a range of −50° C. or more and 50° C. or less, is 17° C. or less. If the absolute value of the difference between Tg1 and Tg2 is more than 17° C., the resin composition is reduced in transparency at low temperature even if favorable in transparency at room temperature. The absolute value of the difference between Tg1 and Tg2 is preferably 15° C. or less, more preferably 10° C. or less, further preferably 3° C. or less from the viewpoint that the resin composition has an enhanced transparency at low temperature.

The reason why the resin composition has an enhanced transparency at low temperature due to a reduction in absolute value of the difference between Tg1 and Tg2, although is not clear, is presumed as follows. A common thermoplastic resin is easily changed in refractive index at about the glass transition temperature thereof. Thus, a resin composition comprising a plurality of thermoplastic resins compounded, when respective glass transition temperatures of such thermoplastic resins are distant, is increased in difference between the refractive indexes at the respective temperatures and therefore is also deteriorated in transparency. On the contrary, when the respective glass transition temperatures of such thermoplastic resins are close, the changes of the refractive indexes due to the changes in temperatures of such thermoplastic resins are the same level, and thus the difference between the refractive indexes of both such thermoplastic resins under low temperature is decreased to result in an improvement in transparency at low temperature also in cooperation with a haze value at room temperature, which is set to a certain value or less.

Tg1 and Tg2 of the resin composition are each a peak temperature at tan δ in dynamic viscoelasticity measurement of a resin film comprising the resin composition, and the peak temperature at tan δ at the lowest temperature side is Tg1 and the peak temperature at tan δ at the second lowest temperature side is Tg2, among peak temperatures at tan δ which are each in a range of −50° C. or more and 50° C. or less. Any one of Tg1 and Tg2 corresponds to a peak temperature derived from the thermoplastic resin A and other thereof corresponds to a peak temperature derived from the thermoplastic resin B.

Herein, the thermoplastic resins A and B in the present invention each have a glass transition temperature of −50° C. or more and 50° C. or less, as described above, and thus, when such peak temperatures at tan δ which are each in a range of −50° C. or more and 50° C. or less in dynamic viscoelasticity measurement of the resin film are observed as a single peak, it is meant that such peak temperatures at tan δ are overlapped, and the difference between Tg1 and Tg2 is 0° C.

Dynamic viscoelasticity measurement conditions of the resin film are as described in examples.

(Haze at 23° C.)

The haze at 23° C. of the resin composition of the present invention is less than 1.5. If the haze at 23° C. is more than 1.5%, not only the transparency at about room temperature is reduced, but also the transparency at low temperature is not sufficiently enhanced even if the difference between Tg1 and Tg2 is decreased as described above. The haze at 23° C. of the resin composition is preferably 1.3% or less, more preferably 1.0% or less from the viewpoint of enhancements in transparencies at room temperature and low temperature.

Each of the haze values at 23° C. and −30° C. described below, of the resin composition, is defined as a haze value of the resin composition, as determined by producing predetermined laminated glass as described below and subjecting the laminated glass to measurement. Such laminated glass is produced by providing a film comprising the resin composition and having a thickness of 800 μm, and two sheets of float glass having a thickness of 1.0 mm, a length of 75 mm and a width of 75 mm, and sandwiching the film between the two sheets of float glass, and the haze at 23° C. or −30° C. of the laminated glass is measured by a method according to JIS K 6714. The float glass here used is clear float plate glass according to JIS 3202.

(Thermoplastic Resin)

The resin composition of the present invention has a phase separation structure comprising a continuous phase of a thermoplastic resin A and a dispersion phase of a thermoplastic resin B. The thermoplastic resins A and B are not particularly limited with respect to types thereof as long as these each have the above glass transition temperature, and may be each appropriately selected from the group consisting of a polyolefin-based resin, a polyester-based resin, a polyvinyl chloride-based resin, a polystyrene-based resin, a polyurethane resin, a polyamide resin, a (meth)acrylic resin, a polyvinyl alcohol resin, an ethylene-vinyl acetate copolymer resin, an ionomer resin, an isobutylene resin, a polyvinyl acetal resin, and the like, from the viewpoint that a desired function is exhibited. The resin composition and a resin film comprising the resin composition can have multiple functions depending on the type of a combination of such resins, and a resin composition also excellent in transparency at low temperature is obtained.

A resin composition in which the dispersion phase and the continuous phase are formed from an acrylic resin and a polyurethane resin among the above resins is preferable because it can be used in a variety of applications where, for example, transparency, and adhesiveness to an adherend are required. Among these, the thermoplastic resin A is preferably a polyurethane resin and the thermoplastic resin B is preferably an acrylic resin.

(Acrylic Resin)

The resin composition preferably comprises an acrylic resin as the thermoplastic resin B, as described above. The resin composition of the present invention easily ensures transparency by use of an acrylic resin. Moreover, the resin composition is also easily improved in adhesiveness to other member such as glass. In the case of use in a glass laminate such as laminated glass, the occurrence of warpage is easily prevented.

The acrylic resin is an acrylic polymer (b). The acrylic polymer (b) may be a polymer of a monomer component appropriately selected so that the glass transition temperature is in the above-mentioned range.

For example, the acrylic polymer (b) may be a polymer of a monomer component comprising an acrylic monomer (b1) having at least one functional group (X) selected from the group consisting of a hydroxy group, a carboxy group, a thiol group, an amino group, a group having an ether bond, a group having a urethane bond and a group having an amide bond. The resin composition of the present invention is increased in compatibility with and dispersibility in a polyurethane resin due to use of the acrylic monomer (b1) having such a functional group 00, and more easily ensures transparency due to a decrease in size of the dispersion phase.

The acrylic monomer (b1) may have only one kind of the functional group (X) or two or more kinds thereof.

The functional group (X) is, among these described above, preferably at least one selected from the group consisting of a hydroxy group, a carboxy group, an amino group, a group having an ether bond, a group having a urethane bond and a group having an amide bond. Among these, at least one selected from the group consisting of a hydroxy group, a carboxy group, a group having an ether bond and a group having a urethane bond is more preferable from the viewpoints of a decrease in size of the dispersion phase and a more enhancement in transparency. Among these, at least one selected from the group consisting of a hydroxy group, a group having an ether bond and a group having a urethane bond is further preferable and the acrylic polymer (b) still further preferably contains a hydroxy group as the functional group (X) from the viewpoint of heat resistance.

The acrylic monomer (b1) is a compound having a (meth)acryloyl group, in addition to the functional group (X) and is preferably a monofunctional monomer having one (meth)acryloyl group.

Specific examples of the acrylic monomer (b1) having a hydroxy group include hydroxyalkyl (meth)acrylates such as 2-hydroxyethyl (meth)acrylate, 3-hydroxypropyl (meth)acrylate, and 4-hydroxybutyl (meth)acrylate, and phthalic acid ester-based compounds such as 2-acryloyloxyethyl-2-hydroxypropylphthalate and 2-methacryloyloxyethyl-2-hydroxylpropylphthalate. Among these, hydroxyalkyl (meth)acrylate is preferable. The number of carbon atoms in a hydroxyalkyl group in such hydroxyalkyl (meth)acrylate is not particularly limited, and is, for example, 1 to 6, preferably 2 to 4. Such hydroxyalkyl (meth)acrylate is preferably hydroxyalkyl acrylate from the viewpoint of, for example, a decrease in glass transition temperature of the acrylic polymer (b).

Herein, the "(meth)acryloyl group" means an acryloyl group or a methacryloyl group, the "(meth)acrylate" means acrylate or methacrylate, and much the same is true on other similar terms.

Examples of the acrylic monomer (b1) having a carboxy group include acrylic acid, methacrylic acid, ω-carboxy-polycaprolactone mono(meth)acrylate. The number of repeating units of polycaprolactone in ω-carboxy-polycaprolactone mono(meth)acrylate is about 2 to 5, and is preferably 2 to 3. Such a carboxyl group-containing acrylic monomer is preferably ω-carboxy-polycaprolactone mono (meth)acrylate.

Examples of the acrylic monomer (b1) (ether bond-containing acrylic monomer) where the functional group (X) is a group having an ether bond include cyclic ether group-containing (meth)acrylate. The cyclic ether group-containing (meth)acrylate here used is one having an epoxy ring, an oxetane ring, a tetrahydrofuran ring, a dioxorane ring, or a dioxane ring. Among these, (meth)acrylate containing an epoxy ring, an oxetane ring, a dioxorane ring is preferable, and oxetane ring-containing (meth)acrylate is particularly preferable.

Examples of the epoxy ring-containing (meth)acrylate include glycidyl (meth)acrylate, 2-hydroxyethyl (meth)acrylate glycidyl ether, 3-hydroxypropyl (meth)acrylate glycidyl ether, 4-hydroxybutyl acrylate glycidyl ether, 5-hydroxypentyl (meth)acrylate glycidyl ether, and 6-hydroxyhexyl (meth)acrylate glycidyl ether.

Examples of the oxetane ring-containing (meth)acrylate include (3-methyloxetan-3-yl)methyl (meth)acrylate, (3-propyloxetan-3-yl)methyl (meth)acrylate, (3-ethyl-oxetan-3-yl)methyl (meth)acrylate, (3-butyloxetan-3-yl) methyl (meth)acrylate, (3-ethyloxetan-3-yl)ethyl (meth) acrylate, (3-ethyloxetan-3-yl)propyl (meth)acrylate. (3-ethyloxetan-3-yl)butyl (meth)acrylate, (3-ethyloxetan-3-yl)pentyl (meth)acrylate, and (3-ethyloxetan-3-yl)hexyl (meth)acrylate.

Examples of the tetrahydrofuran ring-containing (meth) acrylate include tetrahydrofurfuryl (meth)acrylate, r-butyrolactone (meth)acrylate, and a multimer ester of tetrahydrofurfuryl alcohol and acrylic acid.

Examples of the dioxorane ring-containing (meth)acrylate include (2-methyl-2-ethyl-1,3-dioxoran-4-yl)methyl (meth) acrylate. (2,2-cyclohexyl-1,3-dioxoran-4-yl)methyl (meth) acrylate, (2,2-dimethyl-1,3-dioxoran-4-yl)methyl (meth) acrylate, and (2-methyl-2-isobutyl-1,3-dioxoran-4-yl) methyl (meth)acrylate.

Examples of the dioxane ring-containing (meth)acrylate include (5-ethyl-1,3-dioxan-5-yl)methyl(meth)acrylate.

The ether bond-containing acrylic monomer may be polyoxyalkylene-containing (meth)acrylate, and examples include polyethylene glycol monoalkyl ether (meth)acrylates such as diethylene glycol monoethyl ether (meth) acrylate and polyethylene glycol monoethyl ether (meth) acrylate (the number of repeating units of ethylene glycol is, for example, 3 to 20), and polypropylene glycol monoalkyl ether (meth)acrylates.

The ether bond-containing acrylic monomer may be alkoxy-containing (meth)acrylate such as 3-methoxybutyl (meth)acrylate.

The ether bond-containing acrylic monomer is preferably cyclic ether group-containing (meth)acrylate. Suitable specific examples of the cyclic ether group-containing (meth) acrylate include glycidyl (meth)acrylate, (2-methyl-2-ethyl-1,3-dioxoran-4-yl)methyl (meth)acrylate, and (3-ethyloxetan-3-yl)methyl (meth)acrylate. Among these, (3-ethyloxetan-3-yl)methyl (meth)acrylate is more preferable.

Examples of the acrylic monomer (b1) (urethane bond-containing acrylic monomer) where the functional group (X) is a group having a urethane bond include 1,2-ethanediol-1-(meth)acrylate 2-(N-butylcarbamate).

Examples of the acrylic monomer (b1) containing an amino group include N,N-dimethylaminoethyl (meth)acrylate, N,N-dimethylaminoethyl(meth) methacrylate, and N,N-diethylaminoethyl (meth)acrylate.

Examples of the acrylic monomer (b1) (amide bond-containing acrylic monomer) where the functional group (X) is a group having an amide bond include N,N-dimethyl (meth)acrylamide, N-isopropyl(meth)acrylamide, N,N-diethyl(meth)acrylamide, and N-hydroxyethyl(meth)acrylamide.

The acrylic monomer (b1) may also be a polyfunctional monomer having two or more (meth)acryloyl groups. Specific examples include pentaerythritol tri(meth)acrylate, dipentaerythritol penta(meth)acrylate, tetramethylolmethane tri(meth)acrylate, diethylene glycol di(meth)acrylate, triethylene glycol di(meth)acrylate, tetraethylene glycol di(meth)acrylate, dipropylene glycol di(meth)acrylate, tripropylene glycol di(meth)acrylate, and tetrapropylene glycol di(meth)acrylate.

The acrylic monomer (b1) having the functional group (X) in the acrylic polymer (b) may be used singly or in combinations of two or more kinds thereof. The acrylic monomer (b1) having the functional group (X) is compounded, for example, in an amount of 5 parts by mass or more based on 100 parts by mass of the monomer component forming the acrylic polymer (b). With the amount compounded of 5 parts by mass or more, the effect due to comprising of the acrylic monomer (b1) is easily exerted. The amount of the acrylic monomer (b1) compounded is preferably 10 parts by mass or more, more preferably 20 parts by mass or more, further preferably 50 parts by mass or more.

An acrylic monomer (b2) having no functional group (X) described below is preferably used in the acrylic polymer (b), in a certain amount, for example, from the viewpoint of a decrease in difference in refractive index between the acrylic polymer and a polyurethane resin described below, and from the viewpoint of adjustment of the glass transition temperature (Tg) of the acrylic polymer (b) in a desired range. Thus, the amount of the acrylic monomer (b1) compounded is preferably 90 parts by mass or less, more preferably 85 parts by mass or less, further preferably 80 parts by mass or less based on 100 parts by mass of the monomer component forming the acrylic polymer (b).

The acrylic polymer (b) may be a polymer obtained by polymerization of a monomer component comprising an acrylic monomer (b2) having no functional group (X), and is preferably a polymerized product of a monomer component comprising an acrylic monomer (b2) having no functional group (X), in addition to the acrylic monomer (b1).

The acrylic monomer (b2) here used is preferably a monofunctional monomer having one (meth)acryloyloxy group. Examples of the acrylic monomer (b2) include alkyl (meth)acrylate, alicyclic structure-containing (meth)acrylate, and aromatic ring-containing (meth)acrylate. Such a monomer may be used singly or in combinations of two or more kinds thereof.

In the present invention, use of the acrylic monomer (b2) easily allows to minimize difference in refractive index between the acrylic polymer (b) and a polyurethane resin described below. Thus, reflection and refraction barely occur at an interface between phases in a phase separation structure described below, and transparency is easily enhanced. The glass transition temperature (Tg) is also easily adjusted in a desired range.

Examples of the alkyl (meth)acrylate include alkyl (meth)acrylate having 1 to 18 carbon atoms. Specific examples include methyl (meth)acrylate, ethyl (meth)acrylate, n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, isodecyl (meth)acrylate, lauryl (meth)acrylate, myristyl (meth)acrylate, isomyristyl (meth)acrylate, stearyl (meth)acrylate, and isostearyl (meth)acrylate. Among these, alkyl (meth)acrylate whose alkyl group has 1 to 12 carbon atoms is preferable, and alkyl acrylate whose alkyl group has 1 to 12 carbon atoms is more preferable, from the viewpoint of allowing the glass transition temperature (Tg) to be easily adjusted in a desired range. An alkyl acrylate having an alkyl group having 4 to 12 carbon atoms is preferable and an alkyl acrylate having an alkyl group having 4 to 8 carbon atoms is more preferable from the viewpoint of a decrease in glass transition temperature of the acrylic resin.

Examples of the alicyclic structure-containing (meth)acrylate include cyclohexyl (meth)acrylate, isobornyl (meth)acrylate, and dicyclopentanyl (meth)acrylate. Examples of the aromatic ring-containing (meth)acrylate include benzyl (meth)acrylate.

The acrylic monomer (b2) here used may also be a polyfunctional monomer having two or more (meth)acryloyloxy groups. Examples of such a polyfunctional monomer include trimethylolpropane tri(meth)acrylate, pentaerythritol tetra(meth)acrylate, dipentaerythritol hexa(meth)acrylate, tetramethylolpropane tetra(meth)acrylate, ethylene glycol di(meth)acrylate, propylene glycol di(meth)acrylate, 1,6-hexanediol di(meth)acrylate, 1,9-nonanediol di(meth)acrylate, neopentyl glycol di(meth)acrylate, and 1,3-butylene glycol di(meth)acrylate.

The acrylic monomer (b2) is preferably compounded in an amount of 10 parts by mass or more, more preferably 15 parts by mass or more, further preferably 20 parts by mass or more based on 100 parts by mass of the monomer component forming the acrylic polymer (b), for example, from the viewpoint of easy adjustment of the glass transition temperature and from the viewpoints of a decrease in difference in refraction relative to a polyurethane resin described below and an enhancement in transparency. The acrylic monomer (b2) is compounded in an amount of, for example, 95 parts by mass or less, preferably 90 parts by mass or less, more preferably 80 parts by mass or less based on 100 parts by mass of the monomer component forming the acrylic polymer (b) in order to allow a constituent unit derived from the acrylic monomer (b1) to be contained in a certain amount or more.

Alkyl (meth)acrylate is preferably used as the acrylic monomer (b2). Use of alkyl (meth)acrylate allows the glass transition temperature (Tg) to be easily adjusted in a desired range. Such alkyl (meth)acrylate is particularly preferably alkyl acrylate, as described above.

The amount of the alkyl (meth)acrylate forming the acrylic polymer (b), compounded, is preferably 10 parts by mass or more and 80 parts by mass or less, more preferably 15 parts by mass or more and 60 parts by mass or less, further preferably 20 parts by mass or more and 50 parts by mass or less based on 100 parts by mass of the monomer component forming the acrylic polymer (b).

Aromatic ring-containing (meth)acrylate, in addition to the alkyl (meth)acrylate, is preferably contained in the acrylic monomer (b2). The content of the aromatic ring-containing (meth)acrylate is preferably 1 part by mass or more and 20 parts by mass or less, more preferably 2 parts by mass or more and 10 parts by mass or less based on 100 parts by mass of the monomer component forming the acrylic polymer (b). With the content of the aromatic ring-containing (meth)acrylate in the above-mentioned range, the haze at 23° C. of the resin composition can be decreased.

Alicyclic structure—containing (meth)acrylate may also be used in the acrylic monomer (b2). In this case, the content of the alicyclic structure—containing (meth)acrylate is preferably 5 parts by mass or more and 60 parts by mass or less, more preferably 10 parts by mass or more and 40 parts by mass or less based on 100 parts by mass of the monomer component forming the acrylic polymer (b).

The acrylic polymer (b) may be obtained by polymerization in combination use with a vinyl monomer other than the above-mentioned acrylic monomers, and is preferably obtained by polymerization by use of only the above-mentioned acrylic monomers. The acrylic polymer (b) may be obtained by a solution polymerization method, a suspension polymerization method or the like, and is preferably obtained by polymerization due to irradiation with active energy ray, as described below.

(Polyurethane Resin)

The polyurethane resin for use in the present invention is a thermoplastic polyurethane resin. Use of the polyurethane resin allows, for example, adhesiveness to an adherend such as organic glass described below to be improved. A common thermoplastic polyurethane resin is obtained by a reaction of a long-chain polyol component, an isocyanate component and a short-chain diol component. Specifically, the polyurethane resin in the present invention is a resin comprising a structure unit derived from a long-chain polyol component, a structure unit derived from an isocyanate component and a structure unit derived from a short-chain diol component. The polyurethane resin has a structure in which a soft segment formed by a reaction of a long-chain polyol and isocyanate and a hard segment formed by a reaction of a short-chain diol and isocyanate are bound to each other.

<Long-Chain Polyol Component>

The long-chain polyol component contained in the polyurethane resin is a polyol having a molecular weight of 250 or more.

The molecular weight of the long-chain polyol is preferably 500 or more, more preferably 650 or more. With the molecular weight of the long-chain polyol equal to or more than the lower limit value, the glass transition temperature of the polyurethane resin is easily decreased, and the absolute value of the difference between Tg1 and Tg2 is easily decreased, for example, in a case where the glass transition temperature of the acrylic resin is adjusted at a low value. Furthermore, the polyurethane resin is increased in softness and the polyurethane resin by itself is easily improved in transparency. The molecular weight of the long-chain polyol is preferably 2000 or less from the viewpoint that the resin composition is prevented from being excessively reduced in mechanical strength.

The molecular weight of the long-chain polyol is a number-average molecular weight in terms of standard polystyrene as measured by gel permeation chromatography (GPC).

The long-chain polyol contained in the polyurethane resin is not particularly limited with respect to the type thereof, examples thereof include a polyether-based polyol and a polyester-based polyol, and a polyether-based polyol is preferable from the viewpoint that the resin composition is inhibited from being hydrolyzed and is enhanced in moist-heat resistance.

Examples of the polyether-based polyol include polyethylene ether glycol, polypropylene ether glycol, polytetramethylene ether glycol, and polyhexamethylene ether glycol. Among these, polytetramethylene ether glycol is preferable.

Examples of the polyester-based polyol include a compound obtained by a condensation reaction of a polyhydric alcohol and a dibasic acid.

Examples of the polyhydric alcohol include ethylene glycol, propylene glycol, butanediol, butenediol, hexanediol, pentanediol, neopentyl diol, and pentanediol.

Examples of the dibasic acid include adipic acid, sebacic acid, azelaic acid, terephthalic acid, isophthalic acid, maleic acid, and aromatic carboxylic acid.

<Isocyanate Component>

The isocyanate component contained in the polyurethane resin is not particularly limited, and examples thereof include aliphatic isocyanate, alicyclic isocyanate, and aromatic isocyanate.

Examples of the aliphatic isocyanate include hexamethylene diisocyanate, tetramethylene diisocyanate, dodecamethylene diisocyanate, and 2,4,4-trimethyl-1,6-hexane diisocyanate.

Examples of the alicyclic isocyanate include alicyclic isocyanates each having two or more ring structures, such as dicyclohexylmethane 4,4-diisocyanate and 2,2-bis(4-isocyanatecyclohexyl)methane, and alicyclic isocyanates each having one ring structure, such as 1-methyl-2,4-diisocyanatecyclohexane, (1,4-cyclohexanediyl)bisisocyanate, 1-methyl-2,6-diisocyanatecyclohexane, 1,3-bis(isocyanatomethyl)cyclohexane and isophorone diisocyanate.

Examples of the aromatic isocyanate include toluene diisocyanate, diphenylmethane diisocyanate, polymeric MDI, p-phenylene diisocyanate, and naphthalene diisocyanate.

Among these isocyanate components, such alicyclic isocyanate is preferable from the viewpoint that a resin composition excellent in transparency and yellowing resistance is obtained. The number of ring structures in such alicyclic isocyanate may be determined depending on the glass transition temperature of the acrylic resin because a smaller number of ring structures can lead to a lower glass transition temperature.

<Short-Chain Diol>

The short-chain diol contained in the polyurethane resin is a diol having a molecular weight of less than 250. Examples of the short-chain diol include a diol having 2 or more and 10 or less carbon atoms. Among these, a diol having a larger number of carbon atoms is more preferable from the viewpoint that a polyurethane resin low in glass transition temperature is obtained, and thus a diol having 4 or more and 10 or less carbon atoms is preferable. The short-chain diol is preferably a saturated aliphatic diol.

Specific examples of the short-chain diol can include ethylene glycol, 1,3-propanediol, 1,2-propanediol, 1,4-butanediol, 1,3-butanediol, 2-methyl-1,3-propanediol, 1,5-pentanediol, neopentyl glycol, 1,6-hexanediol, 3-methyl-1,5-pentanediol, 1,7-heptanediol, 1,8-octanediol, 1,2-octanediol, 2-ethyl-1,3-hexanediol, 1,9-nonanediol, 1,10-decanediol, 1,2-cyclohexanediol, 1,4-cyclohexanediol, and 1,4-cyclohexanedimethanol.

The hard segment mass ratio (%) of the thermoplastic polyurethane resin can be determined by $(C+D+F)/(C+D+E) \times 100$ with the assumption that the mass of the isocyanate is C, the mass of the short-chain diol is D, the mass of the long-chain polyol is E, and the hydroxyl group mass of the long-chain polyol is F. The thermoplastic polyurethane resin has a hard segment mass ratio of preferably 30% or more and 55% or less, more preferably 35% or more and 52% or less, further preferably 38% or more and 50% or less. With the hard segment mass ratio equal to or less than the upper limit value, the proportion of the hard segment in the polyurethane resin is decreased and the polyurethane resin has an enhanced transparency. With the hard segment mass ratio equal to or more than the lower limit value, handleability of an interlayer film is improved.

In calculation of the hard segment mass ratio, the formulation of the polyurethane resin can be determined by quantitative analysis of the isocyanate, the long-chain polyol, and the short-chain diol with, for example, pyrolysis gas chromatography, NMR, or FT-IR, and the hard segment mass ratio can be calculated by using the above expression based on the formulation.

The polyurethane resin has a glass transition temperature of, for example, 50° C. or less, preferably 30° C. or less, more preferably 20° C. or less as described with respect to the glass transition temperature of the thermoplastic resin B, and further preferably has a glass transition temperature of 10° C. or less. With the glass transition temperature equal to or less than the upper limit value, adhesiveness to organic glass such as a polycarbonate resin is improved.

The polyurethane resin may be any of one produced by a prepolymer method or one produced by a one-shot method, and is preferably one produced by a prepolymer method. Use of a polyurethane resin produced by a prepolymer method allows the glass transition temperature of the polyurethane resin to be easily adjusted at a low value.

The prepolymer method is here a method for producing the polyurethane resin by a reaction of the long-chain polyol and the isocyanate in advance for production of an isocyanate group-containing prepolymer and a reaction of the prepolymer and the short-chain diol. The one-shot method is here a method for producing the polyurethane resin by a simultaneous reaction of the long-chain polyol, the isocyanate and the short-chain diol.

Such production of the polyurethane resin is preferably performed in the presence of a polyurethane production catalyst. The type of the polyurethane production catalyst is not particularly limited, and a conventionally known catalyst system can be suitably used. Specific examples include tin-based, lead-based, iron-based, and titanium-based organometallic compounds, and an amine-based compound.

(Mass Ratio Between Thermoplastic Resins A and B)

The mass ratio (A/B) of the thermoplastic resin A to the thermoplastic resin B is preferably 0.4 or more, more preferably 1 or more, further preferably 1.5 or more. In a case where the amount of the thermoplastic resin A as the continuous phase is larger and the mass ratio (A/B) is as described above, light scattering at the interface between the continuous phase and the dispersion phase can be suppressed to result in an enhancement in transparency at low temperature. In a case where the thermoplastic resin A is the polyurethane resin and the thermoplastic resin B is the acrylic resin, the mass ratio (A/B) is adjusted as described above to result in an improvement in adhesiveness of the resin composition to organic glass such as polycarbonate. Therefore, the resin composition can be suitably used as a glass laminate such as laminated glass.

The mass ratio (A/B) is preferably 5.0 or less from the viewpoint that the amount of the dispersion phase is a certain value or more to prevent the resin composition from being deteriorated in physical properties.

The resin composition of the present invention may comprise a resin component other than the thermoplastic resin A and the thermoplastic resin B as long as the effects of the present invention are exerted. The amount of such other resin component may be herein small. The resin composition more preferably comprises no resin component other than the thermoplastic resin A and the thermoplastic resin B.

Specifically, the total amount of the thermoplastic resin A and the thermoplastic resin B is preferably 90% by mass or more based on the total amount of the resin contained in the resin composition. With the content of 90% by mass or more, a resin film and the like formed from the resin composition can be improved in adhesiveness and the like, and easily ensures transparency. The total amount of the thermoplastic resin A and the thermoplastic resin B is more preferably 95% by mass or more, further preferably 97% by mass or more, most preferably 100% by mass based on the total amount of the resin.

The resin composition of the present invention may appropriately comprise a known additive used in combination with the thermoplastic resin. Specific examples include an ultraviolet absorbing agent, an infrared absorbing agent, an antioxidant, a light stabilizer, an adhesion force modifier, a pigment, a dye, a fluorescent brightener, a crystal nucleating agent, and a compatibilizing agent. For example, a polymerization initiator for use in polymerization of the acrylic polymer (b) or the like may also remain in the resin composition, as described below.

The compatibilizing agent here used can be a graft copolymer or a block copolymer comprising components of the thermoplastic resin A and the thermoplastic resin B. Use of the compatibilizing agent allows for a small dispersion phase and transparency is ensured easily.

The resin composition of the present invention may also be diluted by a solvent and thus used in the form of a diluted liquid. For example, the solvent for use in synthesis of the acrylic polymer (b) or the like may be used as a portion or the entire of a dilution solvent.

While a common resin composition, when laminated on glass such as an interlayer film for laminated glass and used, often comprises a plasticizer in order to allow flexibility to be ensured, the resin composition of the present invention, in which the thermoplastic resin B is the acrylic resin and the thermoplastic resin A, is the polyurethane resin, enables flexibility to be ensured even if comprises no plasticizer. The resin composition, which comprises no plasticizer, can prevent clouding on a resin material such as organic glass, caused by transfer of any plasticizer, even when laminated on an organic material such as organic glass.

(Phase Separation Structure)

The resin composition of the present invention comprises a continuous phase comprising the thermoplastic resin A and a dispersion phase comprising the thermoplastic resin B, in which a phase separation structure is formed. The phase separation structure may be any structure, and is preferably a sea-island structure.

The average longer size with respect to the dispersion phase comprising a thermoplastic resin B is preferably 10 nm or more and 100 µm or less, more preferably 30 nm or more and 3 µm or less, further preferably 40 nm or more and 1 µm or less, particularly preferably 50 nm or more and 500 nm or less. The size of the dispersion phase is thus relatively small, to barely cause reflection and refraction to occur at an interface between phases, resulting in an enhancement in transparency of the resin composition.

The aspect ratio represented by the average longer size relative to the average shorter size is not particularly limited, and is, for example, 1 or more and 500 or less, more preferably 5 or more and 300 or less, further preferably 15 or more and 200 or less.

The longer size and the shorter size are determined by staining a specimen of the resin composition with osmium, thereafter preparing an ultrathin section by a cryomicrotome, and performing measurement with a transmission-type electron microscope. The longer size refers to the length of the longest portion in such each island portion in microscope observation, and the shorter size refers to the length of such each island portion in measurement perpendicular to the longer size. The average longer size and the average shorter size are each the average value in measurement of the respective sizes of any 20 of such island portions.

The ratio (E/F) of the haze (F) at −30° C. to the haze (F) at 0° C. in the resin composition is preferably 2 or less. With the ratio of 2 or less, a resin composition is obtained which is excellent in transparency and less changed in transparency in a region from low temperature to room temperature. The E/F is more preferably 1.8 or less from such a viewpoint.

[Method for Preparing Resin Composition]

The method for preparing the resin composition of the present invention may involve, for example, mixing the thermoplastic resin A and the thermoplastic resin B synthesized in advance (hereinafter, also referred to as "first method").

The thermoplastic resin B may also be prepared by synthesis in the presence of the thermoplastic resin A. In other words, the resin composition may also be prepared by mixing the thermoplastic resin A and a monomer component for forming the thermoplastic resin B to obtain a mixture thereof, and thereafter polymerizing the monomer component in the mixture to thereby synthesize the thermoplastic resin B (hereinafter, also referred to as "second method").

In a case where the thermoplastic resin A is the polyurethane resin and the thermoplastic resin B is the acrylic resin, the resin composition is preferably prepared by the second method. According to the second method, the acrylic resin and the polyurethane resin are in the state of being properly mixed in the resin composition and thus a relatively fine phase separation structure is easily formed to result in an easy enhancement in transparency.

The monomer component for forming the thermoplastic resin B may be polymerized in the presence of a polymerization initiator.

The thermoplastic resin B (for example, the acrylic resin) is not particularly limited, and can be synthesized by polymerizing the monomer component according to a free radical polymerization method, a living radical polymerization method or the like. The polymerization initiator here used may be, for example, an organic peroxide-based polymerization initiator or an azo-based polymerization initiator in a free radical polymerization method. An organotellurium polymerization initiator or the like may be used in a living radical polymerization method. When polymerization is made, a chain transfer agent may be used in addition to the polymerization initiator. Polymerization may also be made by irradiation with active energy ray, and in this case, the polymerization initiator here used may be a photo-polymerization initiator.

The thermoplastic resin B may be obtained by polymerization such as a solution polymerization method or a suspension polymerization method, or may be obtained by polymerization with active energy ray, as described above, and is preferably obtained by a solution polymerization method or polymerization with active energy ray and among them is preferably obtained by a solution polymerization method. Accordingly, it is preferable in the second method to synthesize the thermoplastic resin B by polymerizing the monomer component for forming the thermoplastic resin B in the state where the monomer component and the thermoplastic resin A are dissolved in a solvent.

The solvent is not particularly limited, and examples thereof include aliphatic hydrocarbon-based solvents such as n-pentane, n-hexane, n-heptane and cyclohexane, aromatic hydrocarbon-based solvents such as toluene, ester-based solvents such as ethyl acetate and n-butyl acetate, ketone-based solvents such as acetone, methyl ethyl ketone (MEK) and cyclohexanone, ether-based solvents such as tetrahydrofuran, and dimethylformamide (DMF) and N-methyl pyrrolidone.

The monomer component is preferably polymerized according to free radical polymerization with an organic peroxide-based polymerization initiator in a solution polymerization method. Examples of the organic peroxide-based polymerization initiator include cumene hydroperoxide, benzoyl peroxide, lauroyl peroxide, octanoyl peroxide, stearoyl peroxide, o-chlorobenzoyl peroxide, acetyl peroxide, t-butyl hydroperoxide, t-butyl peroxyacetate, t-butyl peroxyisobutyrate, 3,5,5-trimethylhexanoyl peroxide, pivaloyl (tert-butyl) peroxide, t-butyl peroxy-2-ethylhexanoate, and di-t-butyl peroxide.

The amount of the polymerization initiator compounded is preferably 0.05 parts by mass or more and 6 parts by mass or less, more preferably 0.2 parts by mass or more and 4 parts by mass or less based on 100 parts by mass of the monomer component for forming the thermoplastic resin B. With the amount of the polymerization initiator compounded equal to or more than the lower limit value, polymerizing ability of the monomer component can be improved. With the amount equal to or less than the upper limit value, polymerizing ability commensurate with the amount compounded can be exhibited.

The polymerization temperature and the polymerization time in the free radical polymerization are not particularly limited, and are, for example, 40 to 110° C. and 1 to 24 hours, preferably 60 to 85° C. and 3 to 12 hours.

In a case where the resin composition of the present invention comprises at least any of a resin component other than the thermoplastic resin A and the thermoplastic resin B, and an additive, such resin component and/or additive may be mixed with the thermoplastic resin A and the thermoplastic resin B (or the monomer component for forming the thermoplastic resin B) at any stage. For example, in the second method, such a resin component other than the components of the thermoplastic resin A and the thermoplastic resin B, and such an additive may be mixed with a mixture of the monomer component for forming the thermoplastic resin B, and the thermoplastic resin A, before synthesis of the thermoplastic resin B, or may be mixed with a mixture of the thermoplastic resin A and the thermoplastic resin B, after the synthesis.

The resin composition of the present invention may be obtained by mixing the thermoplastic resin A and the thermoplastic resin B by ultra-high-speed kneading or the like in order to decrease the dispersion phase and enhance transparency.

[Resin Film]

The resin composition of the present invention may be used in any form, and is preferably used in the form of a film. In other words, the present invention provides a resin film comprising the resin composition, as a preferable aspect. Herein, the resin film widely refers to not only a case of a single resin film, but also a case where a resin film is, for example, laminated on or covered with other member and thus is layered or film-shaped, and also refers to a relatively thick resin film commonly called a sheet.

The thickness of the resin film comprising the resin composition of the present invention may be appropriately selected depending on the application and the like, and is, for example, 200 µm or more and 2000 µm or less. The thickness of the resin film is preferably 250 µm or more and 900 µm or less. With the thickness of the resin film in such a range, the resin film can be suitably used in, for example, an interlayer film for laminated glass.

The resin film of the present invention may comprise a single layer, or may form a multilayer film. The multilayer film may have at least one layer of the resin film of the present invention. In other words, the multilayer film may be a laminate of the resin film formed from the resin composition of the present invention, and a resin film formed from a composition other than the resin composition of the present invention. The multilayer film may also be laminate having two or more layers of the resin film formed from the resin composition of the present invention, and also in this case, the laminate may have a resin film formed from a composition other than the resin composition of the present invention.

The resin film of the present invention may be used in an application where transparency, light permeability, and the like are demanded. For example, the resin film may be used in a transparent protective film used in protection of an optical member and the like, a film for an optical member, forming a portion of an optical member, a resin film for glass, used for glass, an adhesive film, a pressure-sensitive adhesive film, and the like, and is preferably used for a resin film for glass.

The resin film of the present invention, when used in a resin film for glass, may be provided on at least one surface of glass. The resin film of the present invention may comprise a single layer, the resin film as a single layer being laminated on a glass surface, or may be laminated in the form of a multilayer film on a glass surface. The multilayer film is preferably placed at a position where the resin film of the present invention is in contact with glass, and thus directly laminated on the glass, but is not required to be directly laminated.

The resin film of the present invention is particularly preferably used in an interlayer film for laminated glass in a case where the thermoplastic resin A is the polyurethane resin and the thermoplastic resin B is the acrylic resin. In other words, the resin film of the present invention, and the multilayer film comprising the resin film of the present invention are each preferably disposed between a pair of glass members and used for an interlayer film which allows the pair of glass members to adhere. The resin composition of the present invention may be used in any form other than a film, as described above.

(Method for Producing Resin Film)

The resin film of the present invention may be produced by extrusion, press forming, or the like of the resin composition. The resin film of the present invention may also be produced by a forming method by coating a release sheet or the like with the resin composition or a diluted liquid thereof and drying the resultant. In a case where the thickness of the resin film is insufficient by one film formation in a case of formation by coating or the like, the resin film may be obtained in the form of one resin film by making a plurality of films and stacking the plurality of films for integration due to compression bonding or the like. The resin film may also be formed with synthesis of the thermoplastic resin B due to polymerization of the monomer component for forming the thermoplastic resin B. For example, a resin film comprising the resin composition comprising the polyurethane resin and the acrylic resin may be formed by forming a mixture comprising the polyurethane resin and the monomer component for the acrylic resin, into a film, and polymerizing the monomer component with the film being kept, to thereby cure the mixture.

In a case where the multilayer film is obtained, the multilayer film may be obtained as one multilayer film by stacking a plurality of films comprising the resin film of the present invention, for integration due to compression bonding or the like, or the multilayer film may be produced by any other method.

[Glass laminate]

The resin film of the present invention is preferably used for glass, as described above, namely, the present invention also provides a glass laminate comprising a glass member and a resin film, as a preferable aspect. The glass member is here selected from the group consisting of inorganic glass and organic glass, as described below.

The glass laminate of the present invention comprises at least one glass member, and the resin film of the present invention, in which the resin film may be provided on at least one surface of the glass member. The resin film of the present invention may comprise a single layer, the resin film as a single layer being laminated on the glass member, or a multilayer film comprising the resin film of the present invention may be laminated on the glass member, as described above. The multilayer film is preferably placed at a position where the resin film of the present invention is in contact with glass, and thus directly laminated on the glass, but may not be directly laminated.

The resin composition of the present invention can be improved in adhesiveness to glass, and thus can be laminated on the glass member at a high adhesion force. The glass member can be allowed to adhere to other member with the resin film laminated on the glass member or the multilayer film being interposed therebetween.

(Laminated Glass)

The glass laminate is preferably laminated glass. The laminated glass comprises the resin film, and a pair of opposite glass members, in which the resin film is disposed between the pair of glass members.

The resin film included in the glass laminate comprises the resin composition. The resin composition comprises the above-mentioned phase separation structure comprising the continuous phase of the thermoplastic resin A and the dispersion phase of the thermoplastic resin B. As described above, the thermoplastic resin A and the thermoplastic resin B each have a glass transition temperature of $-50°$ C. or more and $50°$ C. or less, and the absolute value of the difference between glass transition temperatures Tg1 and Tg2, which are each in a range of $-50°$ C. or more and $50°$ C. or less, is $17°$ C. or less. Additionally, the haze at $23°$ C. of the glass laminate is less than 1.5. A glass laminate satisfying such a requirement is low in haze at $-30°$ C. and excellent in transparency at low temperature.

The ratio (E/F) of the haze (E) at $-30°$ C. to the haze (F) at $0°$ C. of the glass laminate is preferably 2 or less. With the ratio of 2 or less, a glass laminate is obtained which is excellent in transparency and less changed in transparency in a region from low temperature to room temperature. The E/F is more preferably 1.8 or less from such a viewpoint.

A value obtained by subjecting the glass laminate by itself to measurement according to JIS K 6714 is here adopted as the haze value at $23°$ C. or $-30°$ C. of the glass laminate.

In the laminated glass, the resin film may have a single layer structure between the pair of glass members, in which case the pair of glass members may adhere to the resin film and thus be integrated.

The resin film may form the multilayer film between the pair of glass members. In this case, the pair of glass members may adhere to the multilayer film and thus be integrated.

The resin film may be placed at a position so as to be in contact with such a glass member and thus be directly laminated on such a glass member, or may not be directly laminated on such a glass member, but is preferably directly laminated.

The glass member in the glass laminate is selected from the group consisting of inorganic glass and organic glass. Similarly, each of the pair of glass members in the laminated glass is any selected from the group consisting of inorganic glass and organic glass. The pair of glass members in the laminated glass are each preferably inorganic glass or organic glass, each more preferably inorganic glass, and one thereof may be inorganic glass and another thereof may be organic glass.

The inorganic glass is not particularly limited, and examples thereof include various glass plates of float plate glass, reinforced glass, colored glass, polished plate glass, template glass, wire plate glass, lined plate glass, ultraviolet absorbing plate glass, infrared reflection plate glass, infrared absorbing plate glass, green glass, and the like. The inorganic glass may be, for example, surface-treated. The thickness of the inorganic glass is not particularly limited, and is preferably 0.1 mm or more, further preferably 1.0 mm or more, and preferably 5.0 mm or less, further preferably 3.2 mm or less.

The organic glass is not particularly limited, and examples thereof include various organic glass plates such as a polycarbonate plate, a methacrylate plate such as polymethyl methacrylate plate, an acrylonitrile-styrene copolymer plate, an acrylonitrile-butadiene-styrene copolymer plate, a poly ester plate, a fluororesin plate, a polyvinyl chloride plate, a chlorinated polyvinyl chloride plate, a polypropylene plate, a polystyrene plate, a polysulfone plate, an epoxy resin plate, a phenol resin plate, an unsaturated polyester resin plate, and a polyimide resin plate. The organic glass may be appropriately surface-treated.

Among these described above, a polycarbonate plate is preferable from the viewpoint of being excellent in transparency, impact resistance, and burning resistance, and a methacrylate plate such as a polymethyl methacrylate plate is preferable and, among these, polycarbonate plate is preferable, from the viewpoint of being high in transparency and excellent in weather resistance and mechanical strength.

A specific thickness of the organic glass is not particularly limited, and is preferably 0.1 mm or more, further preferably 0.3 mm or more, and preferably 5.0 mm or less, further preferably 3.0 mm or less.

The glass laminate and the laminated glass of the present invention can be used in various fields. Specifically, the glass laminate and the laminated glass are used in window glass for wheeled vehicles such as automobiles and trains, various vehicles such as marine vessels and airplanes, various architectural structures such as buildings, condominium buildings, detached houses, halls, and gymnastic halls, working machines for cutting, polishing, and the like, or constructing machines such as shovels and cranes.

[Method for Producing Glass Laminate]

A glass laminate where a resin film or a multilayer film is provided on one surface of a glass member may be produced by placing the resin film or the multilayer film of the present invention on a surface of a glass member, and performing adhesion to the glass member due to thermocompression bonding or the like.

The laminated glass can be produced by placing the resin film, produced in advance, between a pair of glass members, and performing thermocompression bonding or the like. In a case where the laminated glass of the present invention is produced with a multilayer film, the multilayer film may be produced in advance and the multilayer film may be placed between the pair of glass members. A plurality of the resin films may be stacked between the pair of glass members to integrate the plurality of the resin films, thereby providing a multilayer film, and the pair of glass members may be integrated with the multilayer film being interposed therebetween.

When the laminated glass is produced, any air remaining between the pair of glass members may be, if necessary, subjected to degassing after placing the resin film, the multilayer film, or a plurality of the resin films between the pair of glass members and before thermocompression bonding. The method for degassing is not particularly limited, and may be performed by passing through a pressing roll or charging into a rubber bag and evacuation under reduced pressure.

Temporary adhesion may be performed before thermocompression bonding. Such temporary adhesion may be performed by, for example, placing the resin film, the multilayer film, or a plurality of the resin films between the pair of glass members and pressing the resultant at a relatively low pressure with, if necessary, heating. Such temporary adhesion may be performed by, for example, a vacuum laminator. Such temporary adhesion may be performed after degassing or together with degassing in a case where degassing is performed.

The method for thermocompression bonding is not particularly limited, and pressure may be applied with heating of the resin film or the like placed between the pair of glass members. The heating temperature is preferably 60° C. or more and 150° C. or less, more preferably 70° C. or more and 120° C. or less. The pressure is preferably 0.4 MPa or more and 1.5 MPa or less, more preferably 0.5 MPa or more and 1.3 MPa or less. The pressure here mentioned is an absolute pressure. Examples of such thermocompression bonding include a method with an autoclave and a method with hot pressing, and a method with an autoclave is preferable.

EXAMPLES

The present invention is described in more detail with reference to Examples, but the present invention is not limited to these Examples at all.

The measurement methods and the evaluation methods of physical properties are as follows.

[Glass transition temperatures of thermoplastic resins A and B]

The thermoplastic resin A was a polyurethane resin used in each of Examples and Comparative Examples, and the thermoplastic resin B was an acrylic resin synthesized with the same monomer component at the same monomer ratio as in each of Examples and Comparative Examples. The synthesis conditions in synthesis of the acrylic resin were the same as in each of Examples and Comparative Examples except that no urethane resin was loaded.

A film-shaped sample comprising each of the thermoplastic resins was produced, such each sample was cut out to a size of a width of 5 mm and a length of 4 cm, and measurement with a dynamic viscoelasticity measurement apparatus (apparatus name "DVA-200", manufactured by IT Keisoku Seigyo Co., Ltd.) was performed in the following conditions, to thereby define the peak temperature at tan δ as the glass transition temperature. Table 1 described a glass transition temperature confirmed in a range of −50° C. or more and 50° C. or less. In a case where a plurality of glass transition temperatures were confirmed in a range of −50° C. or more and 50° C. or less, the glass transition temperature at the lowest temperature side was recorded.

(Measurement Conditions)

Deformation mode: tensile mode, measurement temperature: −50° C. to 200° C., rate of temperature rise: 5° C./min, measurement frequency: 1 Hz, strain: 0.08%

[Glass Transition Temperatures Tg1 and Tg2]

Each of the resin films obtained in Examples and Comparative Examples was cut out to a size of a width of 5 mm and a length of 4 cm. Measurement with a dynamic viscoelasticity measurement apparatus (apparatus name "DVA-200", manufactured by IT Keisoku Seigyo Co., Ltd.) was performed in the following conditions, to thereby determine the absolute values of the difference between Tg1 and Tg2 which were obtained from the peak temperatures at tan δ existing between −50° C. and 50° C., starting from the peak on the low temperature side.

(Measurement Conditions)

Deformation mode: tensile mode, measurement temperature: −50° C. to 200° C., rate of temperature rise: 5° C./min, measurement frequency: 1 Hz, strain: 0.08%

[Haze]

Each laminated glass was obtained by providing a film comprising each of the resin compositions obtained in Examples and Comparative Examples and having a thickness of 800 μm, and two sheets of float glass having a thickness of 1.0 mm, a length of 75 mm and a width of 75 mm, and sandwiching the film between the two sheets of float glass, and the haze at 23° C. of such each laminated glass was measured by a method according to JIS K 6714. The haze at −30° C. was measured with a temperature control haze meter (trade name "THM-150FL", manufactured by Murakami Color Research Laboratory Co., Ltd.) at a set temperature in a constant-temperature bath, of −30° C. The respective hazes at 23° C. and −30° C. were measured, and evaluated according to the following criteria. The float glass here used was clear float plate glass according to JIS 3202.

(Evaluation of haze at 23° C.)
A less than 1.0
B 1.0 or more and less than 1.5
C 1.5 or more
(Evaluation of haze at −30° C.)
S less than 1.5
A 1.5 or more and less than 2.0
B 2.0 or more and less than 2.5
C 2.5 or more

[Adhesion Force to Polycarbonate]

The adhesion force to polycarbonate of the resin film was determined by producing a measurement sample according to the following first to third steps, and subjecting the measurement sample to a cross peeling test.

First step: each of the resin films of Examples and Comparative Examples, formed into a resin film having a size of a length of 15 mm and a width of 15 mm, and clear float plate glass having a thickness of 1.8 mm, a length of 25 mm and a width of 100 mm according to JIS 3202 and polycarbonate plate glass having a thickness of 2 mm, a length of 25 mm and a width of 100 mm according to JIS K6735 were prepared. The clear float plate glass and the polycarbonate plate glass were stacked in a cross shape with the resin film being interposed therebetween.

Second step: the clear float plate glass and the polycarbonate plate glass, which were stacked with the resin film being interposed therebetween, was subjected to temporary compression bonding in a vacuum laminator in conditions of 80° C. and 0.1 MPa for 3 minutes by use of a spacer having the same thickness as that of the resin film so that the thickness of the resin film was constant.

Third step: the clear float plate glass and the polycarbonate plate glass subjected to such temporary compression bonding was subjected to main compression bonding in conditions of 80° C. and 0.5 MPa for 1 hour.

Cross peeling test: the maximum load (N) at which the polycarbonate plate glass was peeled from the clear float plate glass at a speed of 10 mm/min at 23° C. in a perpendicular direction to an adhesion surface was measured, and the maximum load (N) here was defined as the adhesion force and evaluated according to the following criteria.

(Evaluation Criteria of Adhesion Force)
A 100 N or more
C less than 100 N

Each component used in Examples and Comparative Examples is as follows.

<Component Forming Thermoplastic Resin A (Polyurethane Resin)>

1. A polyurethane resin was synthesized using the following three components.

(Isocyanate Component)
Dicyclohexylmethane 4,4-diisocyanate (H12MDI) manufactured by Tokyo Chemical Industry Co., Ltd.
1,3-Bis(isocyanatomethyl)cyclohexane (H6XDI) manufactured by Tokyo Chemical Industry Co., Ltd.
Isophorone diisocyanate (IPDI) manufactured by Tokyo Chemical Industry Co., Ltd.

(Long-Chain Polyol Component)
Polytetramethylene ether glycol (PTMEG650) manufactured by Mitsubishi Chemical Corporation, number-average molecular weight 650
Polytetramethylene ether glycol (PTMEG1000) manufactured by Mitsubishi Chemical Corporation, number-average molecular weight 1000

(Short-Chain Diol Component)
Ethylene glycol (EG) manufactured by Tokyo Chemical Industry Co., Ltd.
1,4-Butanediol (1,4-BD) manufactured by Tokyo Chemical Industry Co., Ltd.
1,6-Hexanediol (1,6-HD) manufactured by Tokyo Chemical Industry Co., Ltd.
Coronate HX manufactured by Tosoh Corporation 2. The Following Commercially Available Product was Used.

Polyurethane resin (AG8451), reaction product of aliphatic isocyanate and polyether polyol (PTMEG), manufactured by Lubrizol Corporation <Component Forming Thermoplastic Resin B (Acrylic Resin)>

(Acrylic monomer (b1))
H-ABEI: 1,2-ethanediol-1-acrylate-2-(N-butylcarbamate): product name "Viscoat #216", manufactured by Osaka Organic Chemical Industry Ltd., CAS No.: 63225-53-6
OXE-30: (3-ethyloxetan-3-yl)methyl acrylate, manufactured by Osaka Organic Chemical Industry Ltd.
4-HBA: 4-hydroxybutyl acrylate, manufactured by Nihon Kasei Co., Ltd.
M5300: ω-carboxy-polycaprolactone monoacrylate, product name "M-5300", manufactured by Toagosei Co., Ltd.

(Acrylic monomer (b2))
BzA: benzyl acrylate, manufactured by FUJIFILM Wako Pure Chemical Corporation
BA: butyl acrylate, manufactured by Nippon Shokubai Co., Ltd.
LA: lauryl acrylate, manufactured by NOF Corporation
IBOA: isobornyl acrylate, manufactured by Nippon Shokubai Co., Ltd.
2-EHA: 2-ethylhexyl acrylate, manufactured by Nippon Shokubai Co., Ltd.
CHA: cyclohexyl acrylate, manufactured by Osaka Organic Chemical Industry Ltd.
MA: methyl acrylate, manufactured by Nippon Shokubai Co., Ltd.

<Other>
(Vinyl monomer)
NVP: N-vinyl pyrrolidone, manufactured by Nippon Shokubai Co., Ltd.

Example 11

(Preparation of Resin Composition)
A 400-mL separable flask equipped with a stirring machine, a condenser tube, a nitrogen introduction tube, a thermometer and an initiator feed port and placed in a hot-water bath was prepared. The hot-water bath was installed at 80° C., and a polyurethane resin (AG8451) dissolved in ethyl acetate was loaded into the separable flask. The concentration of the polyurethane resin (AG8451) in such an ethyl acetate solution was 25% by mass. Next, the hot-water bath was installed at 70° C., and thereafter the monomer component for the acrylic resin (acrylic monomer), mixed at a compounding ratio shown in Table 1, was loaded into a reactor, and purged with nitrogen for 30 minutes to thereby remove oxygen in the container. Here, the amounts of compounding were adjusted so that the mass ratio (A/B) between the acrylic resin obtained from the monomer component and the polyurethane resin was a proportion shown in Table 1.

Next, a reaction was performed at 70° C. for 6 hours with addition of a solution of a polymerization initiator in ethyl acetate into a reaction container in several portions. The polymerization initiator was here sequentially added at the start of the reaction and every lapse of 1 hour thereafter. The total amount of the polymerization initiator loaded was 0.77 parts by mass based on 100 parts by mass of the monomer component forming the acrylic resin. After completion of the reaction, the temperature of the hot-water bath was raised to keep boiling of a reaction liquid for 1 hour, thereby completely decomposing the polymerization initiator in the reaction system. Thereafter, ethyl acetate was added to the reaction container, the temperature was dropped to 23° C., and a polymer solution was recovered. The polymer solution obtained was allowed to pass through a filter cloth for removal of a floating object and the like.

Ethanol and toluene were added to the polymer solution obtained above, and the solution was adjusted so that the solid content fraction was 15% by mass and the mixing ratio (mass ratio) in the solvent satisfied ethyl acetate: ethanol: toluene=80:10:10, thereby obtaining a diluted product of the resin composition.

(Production of Resin Film)

A PET release film (trade name "PET50×1-C", manufactured by Nippa Co., Ltd.) was tightly attached to an upper surface of coating glass by ethyl acetate so that a release treatment surface thereof faced up. The release treatment surface of the PET release film was coated with the diluted liquid of the resin composition, obtained above, so that a predetermined thickness was achieved, and thereafter the solvent was removed by drying with a sequential rise of temperature at 30° C. for 20 minutes, at 50° C. for 20 minutes, at 80° C. for 20 minutes, and at 110° C. for 20 minutes, to form a film including the resin composition, on the PET release film. The film formed was peeled from the PET release film, and a plurality of such films peeled were laminated, to thereby obtain a resin film having a thickness of 800 μm. The resin film was stained as described above to provide an ultrathin section and the section was observed, and thus the resin composition forming the resin film was found to have a sea-island structure (phase separation structure in the present invention), have an average shorter size and an average longer size, with respect to the island (dispersion phase), of 50 nm and 1.2 μm, respectively, and have an aspect ratio of 24.

Examples 2 to 4 and Comparative Examples 1 to 2

Each resin film was obtained in the same manner as in Example 1 except that the type and the compounding ratio of the monomer component for the acrylic resin were changed as in Table 1.

Example 5

A resin film was obtained in the same manner as in Example 1 except that a polyurethane resin synthesized using each component described in Table 1 below was used instead of the polyurethane resin used in Example 1 and the type and the compounding ratio of the monomer component for the acrylic resin were changed as in Table 1.

(Synthesis of Polyurethane Resin)

Dicyclohexylmethane 4,4-diisocyanate was used as the isocyanate component, polytetramethylene ether glycol ("PTMG1000" manufactured by Mitsubishi Chemical Corporation, number-average molecular weight 1000) was used as the long-chain polyol component, ethylene glycol was used as the short-chain diol, and triethylenediamine (manufactured by Tokyo Chemical Industry Co., Ltd.) was used as the catalyst. These were used to thereby obtain a polyurethane resin having a formulation shown in Table 1, according to a prepolymer method.

Examples 6 to 7 and Comparative Example 3

Each resin film was obtained in the same manner as in Example 5 except that the type and the compounding ratio of each component for synthesizing the polyurethane resin, and the type and the compounding ratio of the monomer component forming the acrylic resin were changed as in Table 1.

TABLE 1

| | | | | | Example | | | | | | | Comparative Example | | |
|---|---|---|---|---|---|---|---|---|---|---|---|---|---|---|
| | | | | | 1 | 2 | 3 | 4 | 5 | 6 | 7 | 1 | 2 | 3 |
| Resin composition | Thermoplastic resin A (polyurethane resin) | Isocyanate component | Diayclohexylmethane 4.4-disocyanate (H12MDI) | parts by mass | — | — | — | — | 35.1 | — | — | — | — | — |
| | | | 1,3-Bis (isocyanatomethyl) cyclohexane (H6XDI) | | — | — | — | — | — | 35.9 | — | — | — | 187 |
| | | | Isophorone diisocyanate (IPDI) | | — | — | — | — | — | — | 39.0 | — | — | |
| | | Long-chain polyol component | Polytetramethylene ether glycol (PTMEG650) | | — | — | — | — | — | 55.7 | 52.9 | — | — | 68.9 |
| | | Short-chain diol component | Polytetramethylene ether glycol (PTMEG1000) | | — | — | — | — | 60.7 | — | — | — | | |
| | | | Ethylene glycol (EG) | | — | — | — | — | 4.2 | — | — | — | — | — |
| | | | 1,4-Butanediol (1,4-BD) | | — | — | — | — | — | 8.5 | 8.0 | — | — | — |
| | | | 1,6-Hexanediol (1,6-HD) | | — | — | — | — | — | — | — | — | — | — |
| | | | Coronate HX | | — | — | — | — | — | — | — | — | — | 12.4 |
| | AG8451 | | | | 100 | 100 | 100 | 100 | — | — | — | 100 | 100 | — |
| | Amount of resin A used | | | parts by mass | 60 | 70 | 30 | 60 | 60 | 60 | 60 | 60 | 60 | 40 |
| | Glass transition temperature of thermoplastic resin A | | | ° C. | 4 | 4 | 4 | 4 | −11 | 9 | 13 | 4 | 4 | −36 |
| | Hard segment mass ratio (%) (*1) | | | | — | 52 | 52 | 52 | 41 I 47 | | 47 | 52 | 5235 | |

TABLE 1-continued

|  |  |  |  | Example | | | | | | | Comparative Example | | |
|---|---|---|---|---|---|---|---|---|---|---|---|---|---|
|  |  |  |  | 1 | 2 | 3 | 4 | 5 | 6 | 7 | 1 | 2 | 3 |
| Thermo-plastic resin B (acrylic resin) | Acrylic monomer | H-ABEI | parts by mass | — | 26 | 26 | — | — | — | — | 26 | — | — |
|  |  | OXE-30 |  | 50 | 50 | 50 | — | — | — | — | — | — | — |
|  |  | 4HBA |  | — | — | — | 20 | 30 | 20 | 30 | — | — | — |
|  |  | M5300 |  | — | — | — | — | — | — | — | — | 20 | — |
|  |  | BzA |  | 8.6 | 3.7 | 3.7 | 4.7 | 2 | 4.7 | 2 | 31.23 | 16.35 | — |
|  |  | BA |  | 18 | — | — | — | — | — | — | 42.77 | — | 26.7 |
|  |  | LA |  | 23.4 | 20.3 | 20.3 | — | — | — | — | — | — | — |
|  |  | IBOA |  | — | — | — | 29.3 | 30 | 29.3 | 30 | — | 12.47 | 33.3 |
|  |  | 2-EHA |  | — | — | — | 46 | 38 | 46 | 38 | — | 51.18 | — |
|  |  | CHA |  | — | — | — | — | — | — | — | — | — | — |
|  |  | MA |  | — | — | — | — | — | — | — | — | — | 26.7 |
|  | Vinyl monomer | NVP |  | — | — | — | — | — | — | — | — | — | 13.3 |
|  | Amount of resin B used |  | parts by mass | 40 | 30 | 70 | 40 | 40 | 40 | 40 | 40 | 40 | 60 |
|  | Glass transition temperature of thermoplastic resin B |  | ° C. | 34 | 37 | 37 | −11 | −5 | −11 | −5 | −9.8 | −23 | 38.2 |
| [Tg1-Tg2] |  |  | ° C. | 0 | 0 | 0 | 15 | 5 | 5 | 5 | 19 | 25 \| 87 | 87 |
| Haze at 23° C. |  |  | % | 0.9 | 0.6 | 1 | 0.8 | 0.5 | 0.7 | 0.6 | 1.9 | 0.9547 | 54.7 |
|  |  |  | Evaluation | A | A | B | A | A | A | A | c | A i c | C |
| Mass ratio (A/B) of resin 8 to resin A |  |  | — | 1.5 | 2.3 | 0.4 | 1.5 | 1.5 | 1.5 | 1.5 | 1.5 | 1,507 | 0.7 |
| Eval-uation | Haze at −30° C. |  | % | 1.6 | 1.3 | 2,3 | 2.4 | 1.4 | 1.3 | 1.3 | 3 | 5 \| 23.4 | 23.4 |
|  |  |  | Evaluation | A | S | B | 8 | S | S | S | c | C \| C | C |
|  | Adhesion force to polycarbonate |  | Evaluation | A | A | A | A | A | A | A | A | A \| A | A |

(*1) Hard segment mass ratio (%) = 100 × (C + D + F)(C + D + E)
C: Mass of isocyanate
D: Mass of short-chain diol
E: Mass of long-chain polyol
F: Mass of hydroxyl group in long-chain polyol Examples 1 to 7 each exhibiting glass transition temperatures of the thermoplastic resins A and B, which were each in a range of −50° C. or more and 50° C. or less, an absolute value of Tg1-Tg2, of 17° C. or less, and a haze value at 23° C. of less than 1.5%, thus each provided a resin composition satisfying each of the requirements in the present invention. The resin composition was low in haze value at −30° C., excellent in transparency not only at room temperature, but also at low temperature, and also favorable in adhesion force to polycarbonate.

On the contrary, each of the resin compositions of Comparative Examples 1 to 3, which satisfied not all the requirements in the present invention, was high in haze value at −30° C. and inferior in transparency at low temperature.

The invention claimed is:

1. A resin film comprising a resin composition,
wherein the resin film has a thickness of 200 μm or more, and
wherein the resin composition has a phase separation structure comprising a continuous phase of a thermoplastic resin A and a dispersion phase of a thermoplastic resin B, the thermoplastic resin A and the thermoplastic resin B each having a glass transition temperature of −50° C. or more and 50° C. or less, an absolute value of a difference between glass transition temperatures Tg1 and Tg2, which are each in a range of −50° C. or more and 50° C. or less, being 17° C. or less, and a haze of the resin composition at 23° C. measured according to the following method being less than 1.5%:
a laminated glass is produced by providing the resin film having a thickness of 800 μm, and two sheets of float glass having a thickness of 1.0 mm, a length of 75 mm and a width of 75 mm, and sandwiching the resin film between the two sheets of float glass, and a haze at 23° C. of the laminated glass is measured by a method according to JIS K 6714.

2. The resin film according to claim 1, wherein the thermoplastic resin B is an acrylic resin.

3. The resin film according to claim 1, wherein the thermoplastic resin A is a polyurethane resin.

4. The resin film according to claim 1, wherein the glass transition temperatures of the thermoplastic resin A and the thermoplastic resin B are each −40° C. or more and 20° C. or less.

5. The resin film according to claim 1, wherein the thermoplastic resin B is an acrylic resin, the thermoplastic resin A is a polyurethane resin, and a mass ratio (A/B) of the polyurethane resin to the acrylic resin is 0.4 or more.

6. The resin film according to claim 3, wherein the polyurethane resin has a hard segment mass ratio of 30% or more and 55% or less.

7. The resin film according to claim 3, wherein a long-chain polyol component contained in the polyurethane resin has a molecular weight of 650 or more.

8. The resin film according to claim 3, wherein the polyurethane resin contains a polyether-based polyol.

9. The resin film according to claim 2, wherein the acrylic resin is an acrylic polymer (b) as a polymer of a monomer component, and the monomer component comprises an acrylic monomer (b1) having at least one functional group (X) selected from the group consisting of a hydroxy group, a carboxy group, a thiol group, an amino group, a group having an ether bond, a group having a urethane bond and a group having an amide bond.

10. The resin film according to claim 9, wherein the monomer component comprises an acrylic monomer (b2) containing no functional group (X).

11. The resin film according to claim 1, having a thickness of 200 μm or more and 2000 μm or less.

12. A glass laminate comprising the resin film according to claim 1, and a glass member, wherein the resin film is provided on at least one surface of the glass member.

13. A glass laminate comprising a resin film comprising a resin composition, and a pair of opposite glass members, the resin film being placed between the pair of glass members,
- the resin film having a thickness of 200 μm or more,
- the resin composition having a phase separation structure comprising a continuous phase of a thermoplastic resin A and a dispersion phase of a thermoplastic resin B, the thermoplastic resin A and the thermoplastic resin B each having a glass transition temperature of −50° C. or more and 50° C. or less and an absolute value of a difference between glass transition temperatures Tg1 and Tg2, which are each in a range of −50° C. or more and 50° C. or less, being within 17° C., and
- a haze of the glass laminate at 23° C. measured according to JIS K 6714 being less than 1.5%.

14. The glass laminate according to claim 13, wherein a ratio (E/F) of a haze (E) at −30° C. to a haze (F) at 0° C. is 2 or less.

15. The resin film according to claim 1, consisting of the resin composition.

* * * * *